(12) United States Patent
Harris

(10) Patent No.: US 6,971,655 B1
(45) Date of Patent: Dec. 6, 2005

(54) STROLLER AND SAFETY SEAT COMBINATION

(76) Inventor: Jennie V. Harris, 869 Maury St., Memphis, TN (US) 38107

( * ) Notice: Subject to any disclaimer, the term of this patent is extended or adjusted under 35 U.S.C. 154(b) by 0 days.

(21) Appl. No.: 10/801,251

(22) Filed: Mar. 17, 2004

(51) Int. Cl.⁷ .............................................. B62B 1/04
(52) U.S. Cl. ................... 280/47.25; 280/30; 297/250.1
(58) Field of Search .......................... 280/47.25, 657, 280/652, 658, 647, 648, 40, 30, 38, 47.4, 280/642, 47.18, 42, 650; 297/5, 6, 250.1; D12/129

(56) References Cited

U.S. PATENT DOCUMENTS

| | | | |
|---|---|---|---|
| 4,634,177 A | | 1/1987 | Meeker |
| 4,679,804 A | * | 7/1987 | Johnson ....................... 280/30 |
| 4,828,281 A | * | 5/1989 | Sanchas ....................... 280/30 |
| 4,872,692 A | * | 10/1989 | Steenburg ................... 280/30 |
| 4,943,113 A | | 7/1990 | Meeker |
| 4,989,888 A | * | 2/1991 | Qureshi et al. ............... 280/30 |
| 5,104,134 A | * | 4/1992 | Cone ........................... 280/30 |
| D330,527 S | * | 10/1992 | Jones ........................ D12/129 |
| D345,720 S | * | 4/1994 | Pohl ......................... D12/129 |
| 5,398,951 A | * | 3/1995 | Ryu ............................. 280/30 |
| 5,403,022 A | * | 4/1995 | Snider ......................... 280/30 |
| 5,567,008 A | | 10/1996 | Cone, II |
| 5,595,393 A | * | 1/1997 | Batten ......................... 280/30 |
| D383,711 S | * | 9/1997 | Smithley ................... D12/129 |
| 6,012,189 A | * | 1/2000 | Dudley ........................... 5/655 |
| 6,019,421 A | * | 2/2000 | Roh ....................... 297/184.13 |
| 6,039,393 A | * | 3/2000 | Roh ....................... 297/184.13 |
| D431,116 S | | 9/2000 | Gibson et al. |
| 6,296,259 B1 | * | 10/2001 | Anderson ..................... 280/30 |
| 6,367,821 B2 | * | 4/2002 | Thiele .......................... 280/30 |
| 6,454,350 B1 | | 9/2002 | Celestina-Krevh et al. |
| 6,641,164 B2 | * | 11/2003 | Wood et al. ................ 280/648 |
| 6,655,702 B2 | * | 12/2003 | Senger ........................ 280/30 |
| 6,729,630 B2 | * | 5/2004 | Szmidt et al. ........... 280/47.25 |

* cited by examiner

Primary Examiner—J. Allen Shriver

(57) ABSTRACT

A stroller and safety seat combination includes a panel has a front edge, a back edge, a pair of side edges, a top side, and a bottom side. The panel is generally arcuate so that the top side is generally concave from the front edge to the back edge. A pair of side walls is attached to the panel such that each is attached to one of the side edges and extends upwardly therefrom. A strap assembly adapted for releasably securing a child against the top side of the panel is attached to the panel. A coupler is attached to the bottom side of the panel. The coupler is adapted for removably receiving a seatbelt. A pair of wheels is rotatably coupled to the bottom side of the panel. A push handle is attached to the panel and is positioned adjacent to the back edge.

7 Claims, 3 Drawing Sheets

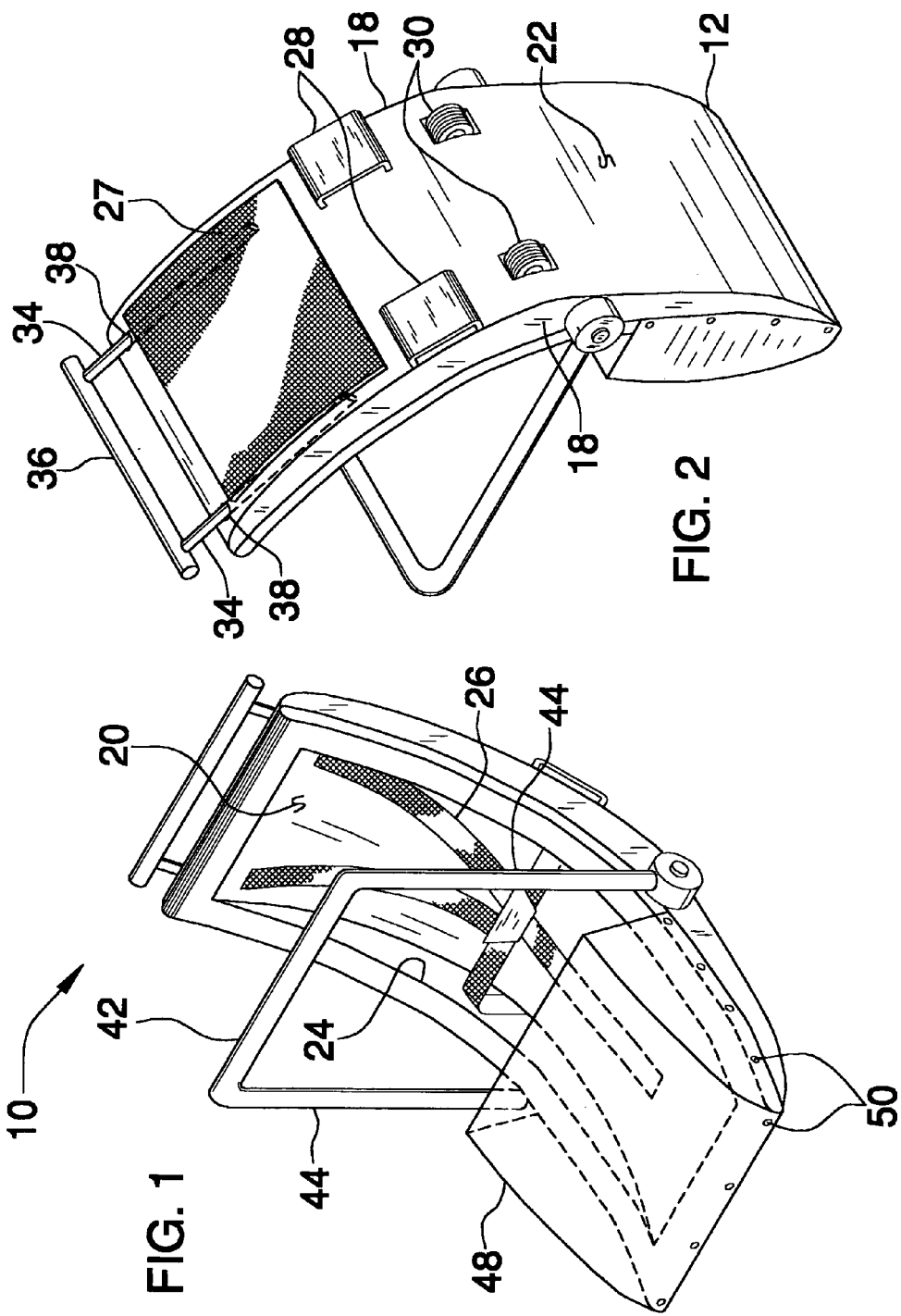

STROLLER AND SAFETY SEAT COMBINATION

BACKGROUND OF THE INVENTION

1. Field of the Invention

The present invention relates to stroller and safety seat devices and more particularly pertains to a new stroller and safety seat device for providing both a safety restraint seat for a vehicle and a stroller.

2. Description of the Prior Art

The use of stroller and safety seat devices is known in the prior art. U.S. Pat. No. 5,567,008 describes a detachable infant seat which may be removed from a base wherein the base may be secured within a vehicle. Another type of stroller and safety seat device is U.S. Pat. No. 4,989,888 having a conventional car seat which also includes retractable wheels built therein which may be extended as needed to convert the car seat into a stroller. U.S. Pat. No. 4,943,113 includes yet another car seat which may be removably attached to a base. This allows the car seat to become a carrier while retaining the base within the vehicle for easy re-insertion of the carrier into the vehicle.

While these devices fulfill their respective, particular objectives and requirements, the need remains for a device that may be used as a both a carrier, a car seat and a stroller in a simple manner. Preferably such a device would not have an internal retracting system for wheels as such a system would be prone to failure and would also add considerable weight to the device. Additional weight would reduce the effectiveness of the device as a child carrier. For this reason, a simple design is needed that keeps low weight while retaining the benefits of a stroller and safety seat combination.

SUMMARY OF THE INVENTION

The present invention meets the needs presented above by generally comprising a panel has a front edge, a back edge, a pair of side edges, a top side, and a bottom side. The panel is generally arcuate so that the top side is generally concave from the front edge to the back edge. A pair of side walls is attached to the panel such that each is attached to one of the side edges and extends upwardly therefrom. A strap assembly adapted for releasably securing a child against the top side of the panel is attached to the panel. A coupler is attached to the bottom side of the panel. The coupler is adapted for removably receiving a seatbelt. A pair of wheels is rotatably coupled to the bottom side of the panel. A push handle is attached to the panel and is positioned adjacent to the back edge.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front perspective view of a stroller and safety seat combination according to the present invention.
FIG. 2 is a rear perspective view of the present invention.

DESCRIPTION OF THE PREFERRED EMBODIMENT

Figure 3:
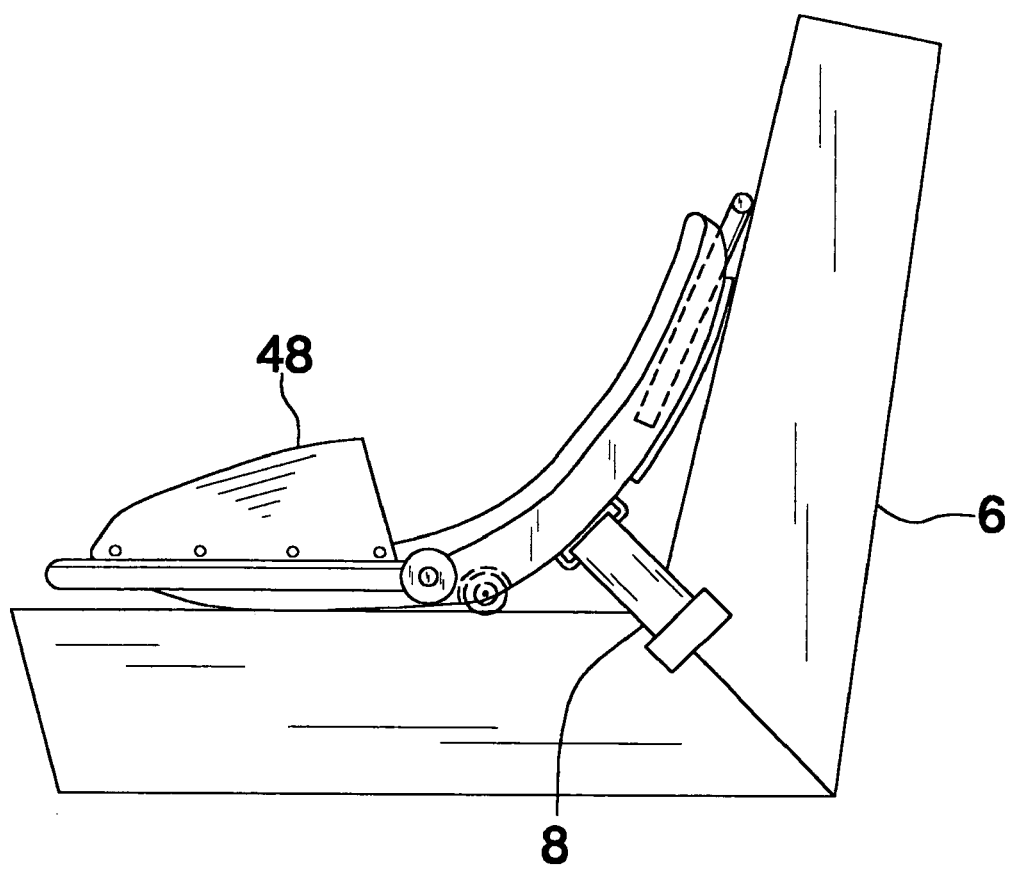
FIG. 3 is a side in-use view of the present invention.
Figure 4:
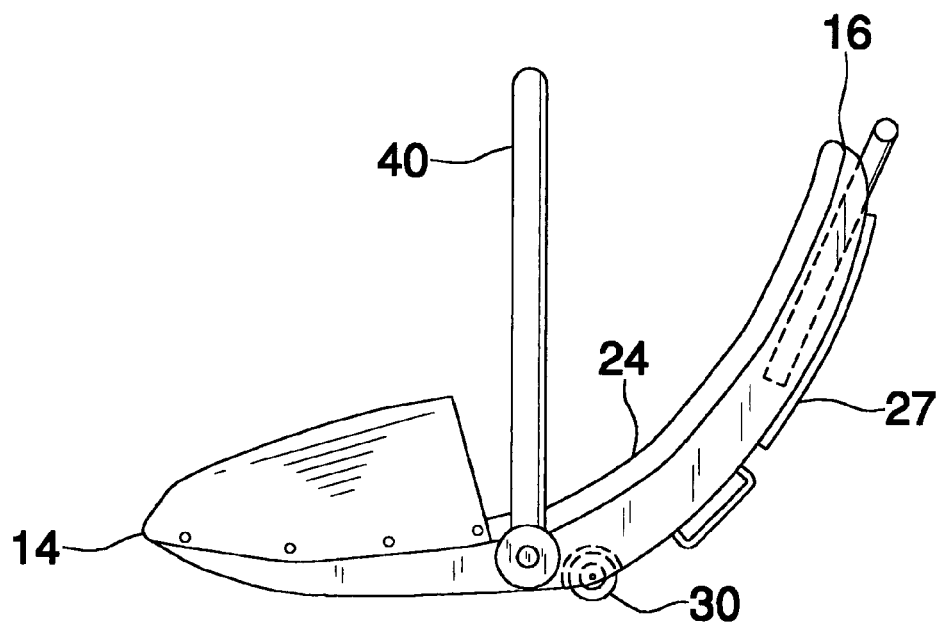
FIG. 4 is a side view of the present invention.
Figure 5:
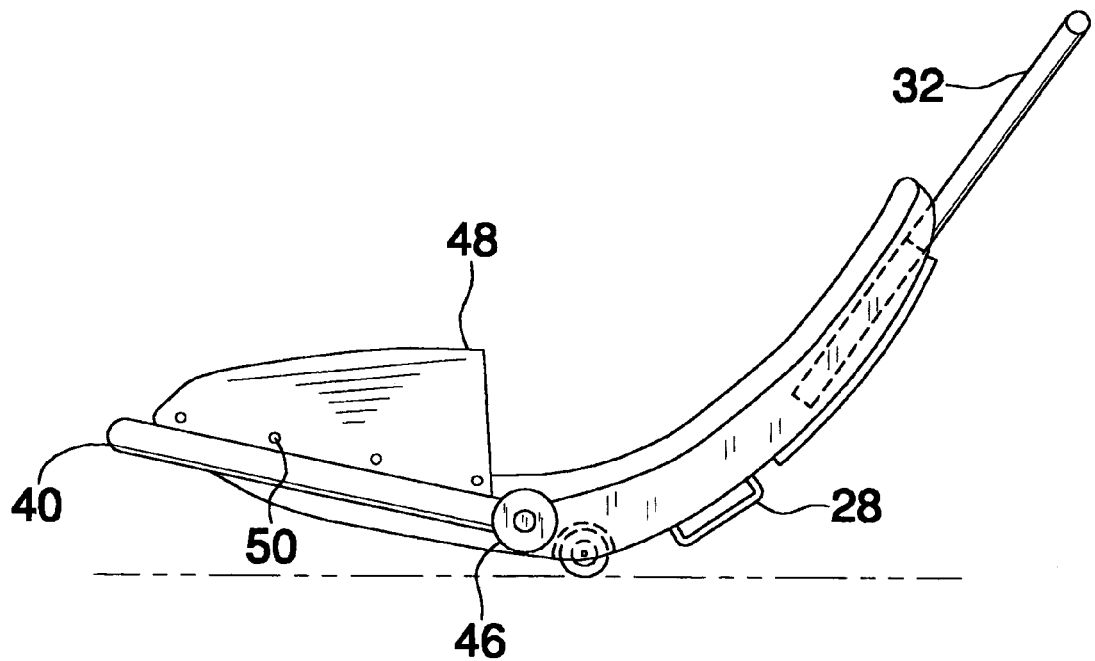
FIG. 5 is a side view of the present invention.

With reference now to the drawings, and in particular to FIGS. 1 through 5 thereof, a new stroller and safety seat device embodying the principles and concepts of the present invention and generally designated by the reference numeral 10 will be described.

As best illustrated in FIGS. 1 through 5, the stroller and safety seat combination 10 generally comprises a panel 12 having a front edge 14, a back edge 16, a pair of side edges 18, a top side 20, and a bottom side 22. The panel 12 is generally arcuate so that the top side 20 is generally concave from the front edge 14 to the back edge 16. A pair of side walls 24 is attached to the panel 12. Each of the side walls 24 is attached to one of the side edges 18 and extends upwardly therefrom. A strap assembly 26 adapted for releasably securing a child against the top side 20 of the panel 12 is attached to the panel 12. The strap assembly 26 is preferably a conventional harness. Cushioning, not shown, may be attached to the top side 20 in a conventional manner. Alternatively, the top side 20 may be coated with a resiliently compressible material. A pocket 27 is preferably attached to the back side for selectively holding a plurality of items.

A coupler 28 is attached to the bottom side 22 of the panel 12. The coupler 28 is adapted for removably receiving a seatbelt 18. The coupler 28 comprises at least one loop member positioned generally between the back 16 and front 14 edges. Preferably, the coupler 28 includes two loop members.

A pair of wheels 30 is rotatably coupled to the bottom side 22 of the panel 12. Each of the wheels 30 is positioned generally adjacent to one of the side edges 18. Each of the wheels 30 is positioned generally between the back 16 and front 14 edges, and it is preferred that the loop members, or couplers 28, are located between the wheels 30 and the back edge 16. The wheels 30 extend less than 3 inches away from the back side 22.

A push handle 32 is attached to the panel 12 and is positioned adjacent to the back edge 16. The push handle 32 includes a pair of arms 34 attached to and extending away from an elongated rod 36. Each of the arms is selectively extendable into one of a pair of openings 38 in the panel 12 such that the rod 36 may be selectively positioned in a retracted position adjacent to the panel 12 or an extended position positioned away from the panel 12.

A carry handle 40 includes a central member 42 and a pair of legs 44 that are attached to and extends downwardly from the central member 42 such that the carry handle 40 is generally U-shaped. Each of the legs 44 has a bottom end 46. The bottom ends 46 are rotatably coupled to one of the side walls 24. The bottom ends 46 of the legs 44 are positioned generally between the front 14 and back 16 edges.

Optionally, a cover 48 is attached to the panel 12 and extends from the front edge 14 toward the back edge 16. The cover 48 extends between the side walls 24. It is preferred that the cover 48 is attached with snaps 50 or other mechanical fasteners so that it may be selectively removed from the panel 12.

In use, a child is placed on the panel 12 on the top side 20 and strapped therein. The panel 12 may be placed in a vehicle chair 6 and secured to the chair 6 with a seatbelt 8. The panel 12 may be removed, when desired, and positioned on a ground surface so that the wheels 30 are supporting the panel 12 above the ground surface. The push handle 32 is extended and used to push the panel 12 along the ground. Also, if a caregiver wishes to move use the panel 12 as a carrier, the carry handle 40 may be used to carry the panel 12, with or without the child therein.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A baby stroller and safety restraint device comprising:
   a panel having a front edge, an back edge, a pair of side edges, a top side, and a bottom side, said panel being generally arcuate to that said top side is generally concave from said front edge to said back edge, a pair of side walls being attached to said panel such that each is attached to one of said side edges and extends upwardly therefrom;
   a strap assembly adapted for releasably securing a child against the top side of said panel being attached to said panel;
   a coupler being attached to said bottom side of said panel, said coupler being adapted for removably receiving a seatbelt;
   a pair of wheels being rotatably coupled to and contained in openings of said bottom side of said panel;
   a push handle being attached to said panel and being positioned adjacent to said back edge;
   a cover being securely attached to said panel and with snaps extending from said front edge toward said back edge, said cover extending between said side walls; and
   a carry handle consisting of a central member and a pair of legs being attached to and extending downwardly from said central member such that said carry handle is generally U-shaped, each of said legs having a bottom end, each of said bottom ends being rotatably coupled to one of said side walls, said bottom ends of said legs being generally centrally located between said front and back edges, said central member being selectively positioned in a first position adjacent to said front edge or in a second position extending over and being spaced from said panel.

2. The device according to claim 1, wherein said coupler comprises at least one loop member positioned generally between said back and front edges.

3. The device according to claim 1, wherein each of said wheels is positioned generally adjacent to one of said side edges, each of said wheels being positioned generally between said back and front edges.

4. The device according to claim 1, wherein said push handle includes a pair of arms attached to and extending away from an elongated rod, each of said arms being selectively extendable into one of a pair of openings in said panel such that said rod may be selectively positioned in a retracted position adjacent to said panel or an extended position positioned away from said panel.

5. The device according to claim 1, wherein said wheels extend less than three inches away from said bottom side of said panel.

6. The device according to claim 1, further including:
   said coupler comprising at least one loop member positioned generally between said back and front edges;
   each of said wheels being positioned generally adjacent to one of said side edges, each of said wheels being positioned generally between said back and front edges; and
   said push handle including a pair of arms attached to and extending away from an elongated rod, each of said arms being selectively extendable into one of a pair of openings in said panel such that said rod may be selectively positioned in a retracted position adjacent to said panel or an extended position positioned away from said panel.

7. The device according to claim 6, wherein said wheels extend less than three inches away from said bottom side of said panel.

\* \* \* \* \*